(12) United States Patent
Jansen et al.

(10) Patent No.: US 10,207,955 B2
(45) Date of Patent: Feb. 19, 2019

(54) REFRACTORIES AND USE THEREOF

(71) Applicant: Refratechnik Holding GmbH, Ismaning (DE)

(72) Inventors: Helge Jansen, Friedland (DE); Thomas Schemmel, Meerbusch (DE); Volker Stein, Goettingen (DE)

(73) Assignee: Refratechnik Holding GmbH, Ismaning (DE)

( * ) Notice: Subject to any disclaimer, the term of this patent is extended or adjusted under 35 U.S.C. 154(b) by 0 days.

(21) Appl. No.: 15/538,409

(22) PCT Filed: Dec. 10, 2015

(86) PCT No.: PCT/EP2015/079307
§ 371 (c)(1),
(2) Date: Jun. 21, 2017

(87) PCT Pub. No.: WO2016/102197
PCT Pub. Date: Jun. 30, 2016

(65) Prior Publication Data
US 2017/0341984 A1 Nov. 30, 2017

(30) Foreign Application Priority Data
Dec. 22, 2014 (DE) .......... 10 2014 019 351

(51) Int. Cl.
*C04B 35/20* (2006.01)
*C04B 35/043* (2006.01)
(Continued)

(52) U.S. Cl.
CPC .......... *C04B 35/043* (2013.01); *C04B 35/053* (2013.01); *C04B 35/20* (2013.01);
(Continued)

(58) Field of Classification Search
CPC ..... F27D 1/0006; F27D 1/003; C04B 35/043; C04B 35/624; C04B 35/6316; C04B 35/66
See application file for complete search history.

(56) References Cited

U.S. PATENT DOCUMENTS

| 3,248,239 A | 4/1966 | Heuer | |
|---|---|---|---|
| 4,497,901 A * | 2/1985 | Ohtsuki | .................. C04B 35/20 501/101 |

(Continued)

FOREIGN PATENT DOCUMENTS

| CA | 1 286 438 C | 7/1991 |
|---|---|---|
| CN | 101 328 070 A | 12/2008 |

(Continued)

OTHER PUBLICATIONS

International Search Report of PCT/EP2015/079307, dated Mar. 4, 2016.
(Continued)

*Primary Examiner* — Noah S Wiese
(74) *Attorney, Agent, or Firm* — Collard & Roe, P.C.

(57) ABSTRACT

A refractory has the form of a dry, mineral batch of fire-resistant mineral materials combined in such a way that refractories which are long-term resistant to fayalite-containing slags, sulfidic melts (mattes), sulfates and non-ferrous metal melts and are used for refractory linings in industrial non-ferrous metal melting furnaces can be manufactured. The refractory at least contains: —at least one coarse-grained olivine raw material as the main component; —magnesia (MgO) meal; —at least one fire-resistant reagent which, during the melting process, acts (in situ) in a reducing manner on non-ferrous metal oxide melts and/or non-ferrous metal iron oxide melts and converts same into non-ferrous metal melts.

32 Claims, 3 Drawing Sheets

(51) Int. Cl.
    *C04B 35/053* (2006.01)
    *C04B 35/632* (2006.01)
    *C04B 35/66* (2006.01)

(52) U.S. Cl.
    CPC ............ *C04B 35/632* (2013.01); *C04B 35/66* (2013.01); *C04B 2235/3418* (2013.01); *C04B 2235/3826* (2013.01); *C04B 2235/40* (2013.01); *C04B 2235/422* (2013.01); *C04B 2235/424* (2013.01); *C04B 2235/425* (2013.01); *C04B 2235/48* (2013.01); *C04B 2235/5427* (2013.01); *C04B 2235/77* (2013.01); *C04B 2235/80* (2013.01); *C04B 2235/96* (2013.01); *C04B 2235/9669* (2013.01)

(56) References Cited

U.S. PATENT DOCUMENTS

| | | | |
|---|---|---|---|
| 4,545,568 A * | 10/1985 | Rothfuss | B22D 41/02 266/280 |
| 5,250,479 A | 10/1993 | Rancoule et al. | |
| 5,262,367 A | 11/1993 | Sundell | |
| 6,645,425 B1 | 11/2003 | Wienand et al. | |
| 8,030,236 B2 * | 10/2011 | Klischat | C04B 35/013 501/108 |
| 8,193,110 B2 | 6/2012 | Jansen | |
| 9,403,728 B2 * | 8/2016 | Jansen | F27D 1/0006 |
| 2009/0227442 A1 * | 9/2009 | Klischat | C04B 35/013 501/111 |
| 2016/0115080 A1 | 4/2016 | Eckstein | |
| 2016/0122248 A1 | 5/2016 | Jansen et al. | |
| 2016/0176762 A1 | 6/2016 | Jansen et al. | |
| 2016/0304403 A1 | 10/2016 | Klischat et al. | |

FOREIGN PATENT DOCUMENTS

| | | |
|---|---|---|
| DE | 14 71 231 A1 | 5/1969 |
| DE | 10 2006 007781 A1 | 8/2007 |
| DE | 10 2006 031700 A1 | 1/2008 |
| DE | 10 2012 015 026 A1 | 1/2014 |
| DE | 20 2013 011886 U1 | 9/2014 |
| DE | 10 2013 008855 A1 | 11/2014 |
| DE | 103 94 173 B4 | 4/2017 |
| EP | 1 058 077 A2 | 12/2000 |
| EP | 2 813 481 A1 | 12/2014 |
| EP | 2 883 853 A1 | 6/2015 |
| JP | S57-42570 A | 3/1982 |
| JP | S58-125659 A | 7/1983 |
| JP | 2003-171170 A | 6/2003 |
| RU | 2424213 C1 | 7/2011 |
| WO | 86/05481 A1 | 9/1986 |
| WO | 2005/001359 A1 | 1/2005 |
| WO | 2008/107343 A1 | 9/2008 |
| WO | 2014/016010 A1 | 1/2014 |
| WO | 2014/206602 A1 | 12/2014 |
| WO | 2015/018813 A1 | 2/2015 |

OTHER PUBLICATIONS

International Search Report of PCT/EP2015/078079, dated Feb. 17, 2016.

ISO 836, International Standard, Terminology for refractories, First edition Mar. 15, 2001, 40 pages.

DIN 51060, Definition of the terms Refractory, Highly Refractory, Jun. 2000, with English translation of relevant parts, 1 page.

Crites, Michael D. et al., "Interaction of Chrome-Free Refractories With Copper Smelting and Converting Slags", Canadian Metallurgical Quarterly, 2000, pp. 129-134, vol. 39, No. 2, Canada.

Kaur, Rajneet, "FCS Slag for Continuous Copper Converting—A thesis submitted in fulfillment of the requirements for the degree of Doctor of Philosophy (PhD)", Jul. 2007, pp. 53-59, School of Civil, Environmental & Chemical Engineering, RMIT University, Melbourne, Australia.

E.F. Tschalich: Technologija i oborudowanie elektrodnich I elektrougolnich predprijatiz, Moskau, Publisher Metallurgija, 1972, p. 157, table 19.

* cited by examiner

REFRACTORIES AND USE THEREOF

CROSS REFERENCE TO RELATED APPLICATIONS

This application is the National Stage of PCT/EP2015/079307 filed on Dec. 10, 2015, which claims priority under 35 U.S.C. § 119 of German Application No. 10 2014 019 351.9 filed on Dec. 22, 2014, the disclosure of which is incorporated by reference. The international application under PCT article 21(2) was not published in English.

The invention relates to refractory products, particularly in accordance with DIN ISO/R 836, DIN 51060, in the form of dry, mineral batches or mixtures on the basis of at least one olivine raw material as a coarse-grained main component, suitable for the production of refractory products for the lining of industrial non-ferrous metal smelting furnaces, as well as in the form of non-molded or molded refractory products produced from the batches, for example in the form of molded bricks, which, when used in industrial non-ferrous metal smelting furnaces, are highly resistant to attack by fayalite slags (iron silicate slags), sulfidic slags (mattes), and sulfates, and are resistant to non-ferrous metal melts, particularly copper melt, over the long term. The invention furthermore relates to the use of non-molded or molded refractory products produced from the batches in an industrial non-ferrous metal smelting furnace, particularly in the region of a furnace zone operated in an oxidizing manner, preferably in the slag melt zone of an industrial non-ferrous metal smelting furnace.

Within the scope of the invention, the term "refractory product" is used as a general term for a refractory batch and for refractory products that are produced from a batch, for example using a liquid binder and/or water, for example by means of molding and/or pressing.

The term "meal" or "powder" is used, within the scope of the invention, to refer to grain structures that comprise usual grain size distributions, for example a Gaussian grain size distribution, and the maximal grain size of which lies below 1.0, particularly below 0.5 mm, for example, at 95 wt.-%, determined as a screen passage value $d_{95}$, for example.

Coarse-grained means that the granulate graining comprises a usual grain size distribution, for example a Gaussian grain size distribution, at 95 wt.-%, for example, ≥0.1, particularly ≥0.5, preferably ≥1.0 mm, also determined as a $d_{95}$ value, for example.

Coarse-grained component or main component particularly means that the coarse graining can form a supporting framework with reciprocally supporting grains in a product produced from a batch.

Non-ferrous metals, such as copper, lead, zinc, nickel or the like, are melted, for example from sulfidic ores, in different vessels, on a large technical scale (for example Pierce-Smith converters, QSL reactors or shaft furnaces). The smelting processes are carried out in zones that are operated both in reducing and in oxidizing manner, i.e. with both reducing and oxidizing smelting sequences, in an industrial non-ferrous metal smelting furnace.

The so-called running time of the furnaces depends, among other things, on the type of refractory brickwork—also called lining—which on the one hand protects the metal mantle of the furnace from the effects of high temperatures of the melted material, flames, and atmosphere, for one thing, and lowers heat losses, on the other hand.

Sulfidic non-ferrous metal ores, for example copper ores, are mainly compounds of metal, for example copper, iron, and sulfur. The compositions of the ores are greatly dependent on the respective deposits.

The refining process that begins with these ores starts with pretreatment and subsequent smelting of the ores. Sulfidic melts having high iron contents as well as a sulfur-containing atmosphere are characteristic for this process.

In the subsequent step, these sulfidic melts are converted to a metal oxide melt, for example a sulfidic copper melt is converted to what is called blister copper. For this purpose, the iron component in the initially sulfidic melt (for example Cu—Fe—S) is first lowered to below 1% by way of a slag formation process. For this purpose, while adding quartz sand ($SiO_2$), the iron is bound in a fayalite slag ($Fe_2SiO_4$) that forms, and removed from the process. The remaining melt, on the basis of Me—S, for example Cu—S (generally $Cu_2S$), is oxidized by blowing air into the melt, for example converted to blister copper. Essential corrosive media in this process are not only the sulfidic melt (Me—Fe—S, for example Cu—Fe—S with a decreasing Fe content during the course of the process) but also the formed fayalite slag ($Fe_2SiO_4$), the high concentration of sulfur in the atmosphere, and the proportions of copper and copper oxide that form at the end of the process.

In the last step of the pyrometallurgical route, the oxidized Me melt is processed further to produce pure metal, for example the blister copper is processed to produce anode copper. In this process, the melt is purified further, with removal of the remaining sulfur and iron. Essentially, the process is determined by means of liquid metal, for example copper, and the resulting slag phases on the basis of Me—Fe—O, which represent the corrosion substances.

In addition, great erosive wear occurs in all the aforementioned processes, due to partly turbulent flow conditions.

The furnace brickwork of an industrial non-ferrous metal smelting furnace is generally exposed to great temperature change stresses and great mechanical and chemical stresses. The temperature change stresses result from the batch method of operation and from blowing in cold process substances. Mechanical stresses are brought about, for example, by means of rotational movements of the furnace. Chemically, the masonry is subjected to stress caused by process slags and metal melts and by volatile compounds of the furnace atmosphere.

Smelting furnaces are classified, in terms of lining technology, in different zones, because the zones are subjected to different stress during operation. In the case of the QSL reactor, for example, a distinction is made between the reaction region, the oxidation region, and the related nozzle regions. Wear of the refractory material is primarily caused by chemical corrosion and by slag attack and other process substances, as well as spalling of infiltrated layers caused by temperature change stresses.

While according to the state of the art, a large proportion of the inner lining of a smelting furnace is generally lined with normal MgO bricks or MgO—$Cr_2O_3$ bricks, the slag zones and, above all, the nozzle zones must be reinforced with very high-quality, highly fired, so-called directly bound, magnesia chromium bricks.

Such refractory linings are found in all types of non-ferrous metal smelting furnaces, independent of their design.

By their nature, the known fired refractory products have an open porosity, which lies approximately in the range between 13 and 20 vol.-%. During the process, process substances such as slags, melts or gases can infiltrate into these open pores and decompose the structure of the brick by means of chemical reactions and/or lead to completely changed thermomechanical properties of the structure in comparison with the original properties of the refractory material. Alternating chemical attacks as well as alternating thermal and thermomechanical stresses lead to accelerated wear and structure weakening, particularly after foreign substance infiltration and corrosion of the refractory product components or of the brick components.

Fayalitic slags are formed during the production of non-ferrous metals from sulfidic ores, for example during the production of copper from copper pyrite ($CuFeS_2$). Copper pyrite is roasted, resulting in what is called copper matte that contains copper sulfide ($Cu_2S$) and iron compounds, for example FeS and $Fe_2O_3$. The copper matte is processed further to produce raw copper, wherein molten copper matte is treated in a converter, with air being supplied and $SiO_2$ being added, for example in the form of quartz. In this process, a fayalitic slag is formed, which primarily contains the mineral fayalite ($2FeO.SiO_2$) and raw copper oxide ($Cu_2O$).

As has already been mentioned, converters for the production of raw copper, for example a Pierce-Smith converter, are primarily lined with fired magnesia chromite bricks at this time (for example DE 14 71 231 A1). However, in this regard, these refractory products only insufficiently withstand attack by sulfates, which result from oxidation of the sulfides, for example in the form of magnesium sulfate. Magnesia chromite bricks furthermore have only limited or insufficient high-temperature anti-wetting properties for non-ferrous metal melts, and they comprise insufficient penetration resistance to hot non-ferrous metal melts.

Magnesia chromite bricks are also used in smelting units for the production of other non-ferrous metals such as Ni, Pb, Sn, Zn, and result in similar problems there.

Refractory masonry of an industrial non-ferrous metal smelting furnace is known from DE 103 94 173 A1, in which furnace non-ferrous metals such as copper, lead, zinc, nickel or the like are melted at temperatures above 700° C. in an oxidizing zone of the furnace, wherein the masonry composed of non-fired bricks composed of refractory material such as MgO or refractory material in which MgO is at least partially replaced with spinel and/or corundum and/or bauxite and/or andalusite and/or mullite and/or flint clay and/or chamotte and/or zirconium oxide and/or zirconium silicate. The bricks have carbon in the form of graphite and of a coke structure formed by a binder that contains carbon, at least on the fire-side or hot-side surface region of the masonry. Within the chemical/physical milieu of the refractory material indicated in this prior art, the carbon is supposed to reduce slag infiltration as the result of a thin, sealing infiltration zone that forms in situ, wherein first reaction products are formed in the brick from the structural components of the brick, obviously when oxygen enters; these products clog pore channels of the brick in situ, so that at least continued entry of oxygen into the structure of the brick components is reduced and thereby a further reaction of the oxygen with carbon is prevented.

A refractory product according to ISO R/836, DIN 51060 for refractory masonry in industrial non-ferrous metal smelting furnaces is known from DE 10 2012 015 026 A1, in the form of a non-molded or molded batch, for example in the form of molded bricks, wherein the refractory product is supposed to be resistant to a high degree, in situ, to attack of fayalitic slags (iron silicate slags) and sulfates and resistant to molten non-ferrous metals, particularly to copper melt. A good anti-wetting property against non-ferrous metal melts, particularly against copper melt, improved penetration resistance against fayalitic slags, and improved resistance against sulfate attack at use temperatures are achieved by means of the use of an olivine raw material as the main component of the refractory product, as well as magnesia meal and silicon carbide meal. A refractory batch that contains the aforementioned substances can be mixed with a liquid binder in the form of silica sol.

Use of olivine raw materials containing forsterite contents ($MgSiO_4$) of at least 70 wt.-% guarantee great corrosion resistance and infiltration resistance against the large amounts of fayalitic slag ($FeSiO_4$). If fayalite slag comes into contact with the refractory material of the structure of the refractory product, the liquidus temperature of the slag increases. The slag "freezes up" onto the refractory material, and therefore further wear reactions do not occur.

Furthermore, the olivine raw material or the forsterite in the olivine raw material comprises poor wettability with regard to non-ferrous metal melts, particularly copper melt, and also very good sulfur corrosion resistance.

In the known refractory products, magnesia can react to form magnesium sulfate, with severe corrosion rates, and this can cause structure weakening. Furthermore, secondary silicate phases that contain calcium, such as dicalcium silicate, merwinite, and monticellite in the magnesia can weaken the structure.

The refractory products or products described in DE 103 94 173 A1 and DE 10 2012 015 026 A1 have proven themselves in superior manner in comparison with the magnesia chromite bricks used previously.

In the case of the two refractory products on the basis of MgO plus graphite (DE 103 94 173 A1) or olivine raw materials having at least 70 wt.-% forsterite contents (DE 10 2012 015 026 A1), as well as in the case of the magnesia chromite bricks, however, the inviscid Me oxides, for example the inviscid copper oxides, but in part, also the inviscid iron oxides, particularly the inviscid Me-Fe oxides, for example the copper iron oxides of the process particularly wet the basic refractory material very greatly. This results in high infiltration potential of these inviscid melts, with the result that the infiltrated structure is weakened. Although the problem is known, it has not been satisfactorily solved until now.

It is the object of the invention to create refractory products on the basis of olivine raw materials as a coarse-grained main component, which products are significantly more resistant to attack by inviscid non-ferrous metal oxides, particularly by inviscid copper oxides, and/or inviscid non-ferrous metal iron oxides, particularly inviscid copper iron oxides during the smelting process. In this regard, however, the refractory products are also supposed to comprise the good anti-wetting properties against pure non-ferrous metal melt, particularly against pure copper melt, to withstand the penetration of fayalitic slags well, and to guarantee resistance to sulfate attack at working temperatures.

This object is accomplished by means of a refractory product in the form of a refractory batch of coarse-grained granulate composed of at least one olivine raw material, particularly one that is low in iron, having high forsterite contents of at least 70 wt.-%, for example, and low iron (III) oxide contents of less than 10 wt.-%, for example, as the main component, as well as containing magnesia meal, particularly high-quality and low-iron, sulfur-resistant magnesia meal, and at least one refractory reagent that has a reducing effect during the smelting process, suitable for reduction of molten inviscid non-ferrous metal oxides and/or molten inviscid non-ferrous metal iron oxides, for example in the form of fine-particle carbon, for example in the form of graphite and/or of a coke structure formed from binder for refractory products that contains carbon, and/or carbon black and/or coke and/or anthracite. In the following, this batch with these ingredients will also be referred to as a basic batch.

High-quality is supposed to mean that the secondary phases that are usually present, such as dicalcium silicate, merwinite, monticellite, etc. are present at less than 2.5 wt.-%, for example. Sulfur-resistant is supposed to mean that the MgO meal is supposed to be low in such silicate secondary phases, because these are usually attacked first by sulfur compounds. For example, the MgO content of the magnesia is supposed to be ≥97 wt.-%.

An olivine raw material and the magnesia meal are low in iron if less than 10 wt.-% iron (III) oxide are present, for example.

Preferably, the batch indicated above can additionally have a fine-particle powder-form silicic acid as an additive.

In addition is supposed to mean that a respective additive and/or a respective admixture is/are additionally added to the mixture of olivine raw material, magnesia meal, and a reagent (basic batch), which is mixed together at 100 wt.-%.

The batch can preferably additionally also contain known antioxidants for refractory products.

Fine-particle is supposed to mean, for example, that the silicic acid is present in the form of microsilica and/or pyrogenic silicic acid and/or precipitated silicic acid.

The invention therefore provides for the use of at least one fine-particle mineral refractory reagent that has a reducing effect on the aforementioned inviscid melts, within the structure of a refractory lining product for non-ferrous metal smelting furnaces according to the invention, produced from a batch according to the invention, wherein the reagent has the property of reducing inviscid non-ferrous metal oxide melt and/or non-ferrous metal iron oxide melt that comes into contact in situ, i.e. in a non-ferrous metal smelting furnace, with the structure during the smelting process, to form corresponding pure non-ferrous metal melts, so that then, the anti-wetting properties of the other structure components of the refractory lining product and, in the case of the use of graphite, furthermore also the anti-wetting properties of the graphite can act on the non-ferrous metal melts. This results in a high degree of corrosion resistance and infiltration resistance of the lining products according to the invention.

Preferably, fine-particle carbon, for example carbon in meal form, particularly in the form of graphite and/or a carbon that results from a binder that contains carbon, by means of temperature action, for example of a coke framework of the product structure, is provided as a reducing reagent. Carbon black and/or anthracite and/or coke, for example, can be used as alternative or additional further fine-particle reducing reagents.

The reducing reagents are preferably contained in the refractory basic batch or in the refractory lining product in amounts between 1 and 20, particularly between 5 and 15 wt.-% with reference to the basic batch components, for example at a fineness below 1000 μm.

The reducing reagent is contained in a batch according to the invention in a mixture with other components, particularly homogeneously distributed. In a refractory lining material produced from a batch according to the invention, particularly in a solidified shaped molded body, for example in a refractory molded brick, the reducing reagent is also present in the structure of the body, particularly also homogeneously.

Non-molded refractory products produced from a batch according to the invention are batched up with water, for example, and/or at least one known binder for refractory products, for example a liquid binder that contains carbon, and introduced into a non-ferrous metal smelting furnace as a refractory lining, wherein subsequent drying and/or tempering, for example, brings about solidification of the freshly batched-up mass. However, drying or tempering can also take place during start up or initial heating of the industrial non-ferrous metal smelting furnace in situ.

Molded refractory products, such as bricks, for example, produced from a batch that contains water and/or at least one known binder for refractory products, for example a liquid binder that contains carbon, are generally dried and/or tempered and subsequently used to line an industrial non-ferrous metal smelting furnace. However, the products produced from the batch can also be fired ceramically and subsequently used as intended.

A refractory batch according to the invention is mainly formed from the basic batch composed of a dry material mixture of olivine raw material, magnesia meal, and reducing reagent, for example graphite as a reducing reagent. Furthermore, it is practical if a dry batch according to the invention can additionally contain up to 4, particularly up to 2.5 wt.-% of antioxidants usually used for refractory products, and/or other additives and/or admixtures usually used for refractory products, wherein, however, the amount ratio of the components olivine raw material, MgO meal, and reducing reagent, for example graphite, of the basic batch is supposed to be maintained.

It is surprising that the reducing reagent, such as the graphite and, if applicable, also the carbon that is derived from the binder that contains carbon, by means of tempering, or the other named carbons is/are only insignificantly consumed by means of oxidation under oxidation conditions in situ, i.e. during smelting operation of an industrial non-ferrous metal smelting furnace. Antioxidants contribute to this—if present—for one thing, as is known, but for another thing the structural milieu of a lining according to the invention obviously also contributes significantly to this, but this cannot be explained as yet. In any case, the carbon surprisingly acts in reducing manner in the structure on wetting and penetrating inviscid non-ferrous metal oxide melts and non-ferrous metal iron oxide melts of the smelting process, so that pure non-ferrous metal melt is produced from the oxides, on which the anti-wetting property of the forsterite present in the structure and, if applicable, also of the carbon, particularly of the graphite, then acts, and thereby further penetration of inviscid oxide melt into the structure is at least hindered.

In this regard, the components of a batch according to the invention or of a refractory product produced from a batch according to the invention mainly act as follows:

Forsterite in the Olivine Raw Material

Stiffening effect on the fayalitic slag melt and anti-wetting effect against non-ferrous metal melt.

MgO Meal

Formation of forsterite with $SiO_2$ added to the batch and/or $SiO_2$ from slag components; resulting from this, reduction in porosity and achievement of the forsterite properties.

Reducing Reagent

Reduction of inviscid non-ferrous metal oxide melts or non-ferrous metal iron oxide melts of the smelting process that come in contact with the structure.

The naturally occurring olivine raw material that is available on the market is used, according to the invention as a coarse-grain granulate—as it is called in the technical field—and is supposed to preferably have 100 wt.-%, if possible, but at least 70 wt.-% of the mineral forsterite, according to the invention. The rest can be the mineral fayalite and/or other known contaminants of the raw material such as enstatite and/or monticellite and/or merwinite. It lies within the scope of the invention to use a synthetically produced, pure forsterite material alone or in combination with a natural olivine raw material. To the extent that olivine raw material is mentioned within the scope of the invention, this also relates to the synthetic forsterite material.

The grain size of the olivine raw material granulate that is used lies in the medium-grain and coarse-grain range, for example by at least 95 wt.-%, for example between 0.1 and 8, particularly between 1 and 8 mm, wherein the granulate can have a Gaussian grain size distribution, for example, or can be formed from grain fractions having irregular grain size distributions.

The olivine raw material is used in amounts from 15 to 74 wt.-%, particularly from 30 to 65 wt.-% in the basic batch mixture according to the invention.

Magnesia is used in fine-particle form, in the form of a meal or powder, with grain sizes, for example determined via screening (called screen grain sizes), of 95 wt.-%≤1 mm ($d_{95}$≤1 mm), for example. Fused magnesia and/or sintered magnesia and/or synthetic dead-burned or caustic magnesia, for example, is used as magnesia.

The terms "meal" and "powder" are understood to be the same terms having the same meaning within the scope of the invention, as they are also known in the field. The terms are generally understood to mean dry, loose bulk granular materials composed of solid particles having a particle size ≤1 mm at 95 wt.-% ($d_{95}$).

The MgO content of the magnesia should preferably amount to >90 wt.-%, particularly >95 wt.-%. The rest is usual contaminants such as silicates and/or iron oxide.

The MgO meals have a Gaussian grain size distribution, for example.

The MgO meal is used in the dry basic batch mixture in amounts of 25 to 55, particularly of 30 to 50 wt.-%.

The batch can additionally also contain silicon carbide (SiC).

Silicon carbide is available on the market as a synthetic product having a high degree of purity and in different grain sizes and grain size distributions, and is used, according to the invention, in powder form or meal form, for example with grain sizes ≤1 mm at 95 wt.-% ($d_{95}$). The grain size distribution preferably corresponds to a Gaussian grain size distribution.

The SiC powder is used at a purity of >90 wt.-%, particularly >94 wt.-% of SiC. The additional amount used in the dry batch mixture amounts up to 15, particularly up to 10 wt.-%.

The additional fine-particle dry silicic acid is a silicic acid, for example, that reacts with the MgO of the magnesia meal in an aqueous milieu, with the formation of magnesium silicate hydrate phases, and forms magnesium silicate hydrate gel and/or magnesium silicate hydrate crystallites and/or magnesium silicate hydrate crystals. The $SiO_2$ content of the fine-particle dry silicic acid preferably lies above 90 wt.-%, particularly above 94 wt.-%. It has surprisingly been shown that dry fine-particle silicic acid forms MSH phases with the MgO of the magnesia more quickly when water enters into the batch according to the invention, and hardens more quickly, and produces higher cold pressure strength values.

The silicic acid must be selected to have such fine particles that a reaction between the MgO of the magnesia particles and particles of the silicic acid occurs in a fresh batch mass that is formed by means of adding water to a dry batch according to the invention and mixing, and magnesium silicate hydrate phases—also called MSH phases hereinafter—form, for example as a gel and/or crystallites and/or crystals, which bring about solidification of the mass that contains water, in the manner of hydraulic setting. Preferably, the batch is put together in such a manner, for this purpose, that a pH value above 7, particularly above 10 occurs in the aqueous milieu, in other words after water is added to the batch according to the invention.

Accordingly, crystalline quartz meals having a fineness of the quartz particles below 500, particularly below 200 μm, are suitable for the reaction to form MSH phases.

Furthermore, the following are particularly suitable for the invention as dry, fine-particle silicic acids:

Silica dust

Silica dust is a very fine, non-crystalline, amorphous $SiO_2$ powder, which is formed in an electric arc furnace as a byproduct in the production of elemental silicon or of silicon alloys. It is offered for sale on the market under the trade names silica dust or microsilica, for example, and generally has more than 85 wt.-% $SiO_2$. The particle size of the silica dust—also called silica fume—generally lies below 1 mm. The English term is "silica fume."

Pyrogenic silicic acid

Pyrogenic silicic acids are very pure $SiO_2$ powders having $SiO_2$ contents up to 99 wt.-% and generally particle sizes between 50 and 50 nm, for example, and a high specific surface area between 50 and 600 m$^2$/g, for example. These silicic acids are produced by means of flame hydrolysis. Pyrogenic silicic acid is offered for sale on the market under the trade name Aerosil, for example. The English term is "fumed silica."

Precipitated silicic acid

In the production of precipitated silicic acid using the wet path, one proceeds from alkali silicate solutions from which very pure amorphous silicic acids are precipitated by means of the addition of acid (86-88 wt.-% $SiO_2$; 10-12 wt.-% water). The particle size lies between 1 and 200 μm, and the specific surface area between 10 and 500 m$^2$/g. Precipitated silicic acids are sold under the trade names "Sipernat" or "Ultrasil," for example. In spite of the water content, these silicic acids are not liquid but rather dry and powdery.

Within the scope of the invention, at least one of the aforementioned silicic acids is used according to a particular embodiment. It is practical if the silicic acids are selected with regard to their ability to react with the MgO of the magnesia meal, and if it is ensured that the silicic acid reacts with MgO as completely as possible when hardening.

The fine-particle dry silicic acid is added to the dry batch mixture at up to 10, particularly from 0.5 to 6 wt.-%.

According to one embodiment, according to the invention preferably only water is added to the dry basic batches according to the invention as described above, which are calculated to 100 wt.-%, for production of refractory products according to the invention.

Preferably, therefore, the following dry basic batches are composed in wt.-%:

Olivine raw material: 15 to 74, particularly 30 to 65,
Magnesia meal: 25 to 55, particularly 30 to 50,
Reducing reaction substance, particularly carbon, particularly graphite: 1 to 30, particularly 5 to 20

The following components can be additionally added to this mixture of the basic batch, preferably in the following amounts in wt.-%.

Fine-particle silicic acid: 0 to 10, particularly 0.5 to 6
SiC: 0 to 15, particularly 0 to 10
Antioxidants: 0 to 4, particularly 0.5 to 2.5
Coarse-grained refractory material granulate: 0 to 4, particularly 0.1 to 3.5
Refractory fine-particle material: 0 to 4, particularly 0.1 to 3.5
Additive for refractory products: 0 to 2, particularly 0.1 to 1.5
Binder for refractory products: 0 to 10, particularly 0.1 to 6

Preferably, the silicic acid is at least one of the aforementioned amorphous silicic acids.

The amounts of the reaction partners MgO and $SiO_2$ in batches according to the invention are selected in such a manner that when water is added from 1 to 10, particularly from 2.5 to 6 wt.-% with reference to the dry substance of the batch, during a time period between 6 and 120, particularly between 8 and 12 hours, in a temperature range from 50 to 200, particularly from 100 to 150° C., cold pressure strengths from 40 to 160, particularly from 60 to 150 MPa can be guaranteed.

Preferably it is provided, according to the invention, that the MgO of the magnesia meal that is capable of reaction is present, in terms of amount, predominantly with reference to the fine-particle silicic acid that is capable of reaction. From this, the result is supposed to be achieved that after water is added, MgO-rich MSH phases are formed, which can form forsterite (2 $MgO.SiO_2$) under the effect of high temperatures up to 1350° C., for example, which increases the forsterite proportion of the olivine raw material, according to the invention.

According to the invention, predominant mass ratios of MgO to $SiO_2$ up to 500:1 are practical. In particular, the ratio lies between 1.2:1 and 100:1, preferably between 1.34:1 and 50:1, very particularly preferably between 1.34:1 and 35:1.

Refractory products according to the invention are produced from dry batches according to the invention, after water is added, wherein a mixture with amounts of water, with reference to the mass of the dry batch, amounts to 1 to 10 wt.-%, preferably 2.5 to 6.0 wt.-%.

So-called fresh masses that contain water, for example for monolithic linings, with water contents between 1 and 5, particularly between 1.5 and 3 wt.-%, are pressed, according to the invention, using usual pressing methods, to form molded brick blanks. The molded bricks are allowed to harden and dry, according to the invention, in the temperature range between 15 and 200, preferably between 50 and 200, particularly between 100 and 150° C., with MSH phases being formed. After hardening, the bricks demonstrate relatively great strength and can be handled, so that a refractory lining can be built from them. According to the invention, the bricks have cold pressure strength values between 40 and 100, for example, particularly between 60 and 80 MPa.

It lies within the scope of the invention to ceramically fire the molded and, if applicable, tempered and dried bricks, so that sintered products, for example, out of forsterite, are formed from MSH phases, for example, and sintering bridges out of forsterite are formed, for example, between the olivine grains or olivine particles and/or MgO meal particles and/or, if applicable, $SiO_2$ particles. Ceramic firing is preferably carried out in the temperature range from 400 to 1400, particularly from 600 to 1200° C., and over a time period from 1 to 24, particularly from 4 to 12 hours, wherein it is advantageous to conduct firing in a reducing atmosphere.

It is sufficient to add from 1 to 5, particularly from 1.5 to 3 wt.-% water to a batch according to the invention for pressing of bricks, particularly for the formation of MSH phases.

It lies within the scope of the invention to additionally provide known plasticizers in the batch or to add them to the mix that contains water, in order to increase the ductility of the mix. Such plasticizers are known to a person skilled in the art. They are generally added in amounts up to 2, particularly from 0.1 to 1.5 wt.-%.

With higher water contents, for example from 4 to 10 wt.-%, particularly from 4 to 6 wt.-%, ductile casting masses or ramming masses are produced, according to the invention, from the dry batches according to the invention, and refractory monolithic pre-molded prefabricated parts are produced from them by means of shaping in molds. In this regard, solidification in the case of MSH phase formation takes place at room temperatures, for example, and drying takes place with a corresponding elevated temperature treatment. In this regard, the strength development of the molded mass corresponds to that of molded and tempered brick structures that form a coke framework.

It is practical if a product according to the invention is produced in that a homogeneous mix with a predetermined plastic or ductile or flow-capable processability is produced from a batch having at least the dry substances olivine raw material, magnesia meal, and reducing reagent, for example carbon in the form of carbon black and/or graphite and/or anthracite and/or coke, as well as, if applicable, additionally silicic acid and/or SiC and/or antioxidants and/or dry, particularly powder-form synthetic resin binder, and/or flow agents and water and/or a liquid binder for refractory products, using suitable mixers. This ductile or flow-capable mass of the mix can be used on site for lining smelting converters. As has already been described, however, monolithically molded prefabricated parts or pressed bricks can also be produced from the mix; the latter can be used for lining smelting converters, for example, either unfired or ceramically fired.

The invention therefore also relates to a dry batch composed exclusively or mainly, for example, i.e. above 80 wt.-%, preferably 90 wt.-%, particularly above 95 wt.-% of olivine raw material granulate, MgO meal, fine-particle carbon, particularly graphite, if applicable a fine-particle dry silicic acid, particularly in the form of microsilica, and/or, if applicable, a dry, for example powder-form binder, for example containing carbon, for example a synthetic resin binder for refractory products and/or SiC and/or at least one antioxidant and/or at least one additive. The respective rest can be, for example, at least one other refractory coarse-grained material granulate and/or fine-particle refractory material, for example magnesia chromite, magnesium spinels, spinels, chromium oxide, zirconium oxide, silicon nitride, zirconium and/or at least one refractory, fine-particle or meal-form admixture such as magnesia chromite, magnesium spinels, spinels, chromium oxide, zirconium oxide, silicon nitride, zirconium. Furthermore, it is practical if at least one further known additive for refractory batches, such as a liquefier and/or binding regulator is/are present.

For example, within the scope of the invention, pressed by means of pressing or non-pressed molded bodies are produced from a batch mixture as indicated above, containing water and/or containing binder and the molded bodies are brought to residual moisture values preferably between 0.1 and 2 wt.-% by means of drying and/or tempering, for example, or, according to a further embodiment, the molded bodies are additionally fired ceramically in a ceramic kiln, at temperatures between preferably 400 and 1400, particularly between 600 and 1200° C., preferably in a reducing atmosphere, for a period preferably between 1 and 24, particularly between 4 and 12 hours. In this regard, the firing conditions are selected, according to the invention, in such a manner that the components olivine raw material, MgO meal, and reducing reagent, for example graphite, do not react with one another during firing, if possible, or do so only to a slight degree, so that these components are available in the structure in situ, in the smelting unit, for example in the converter, during attack of a melt and/or slag, in order to guarantee refractoriness according to the invention, particularly to guarantee the anti-wetting effect for the non-ferrous metal melt and the chemical-physical stiffening effect against slag melt and the reducing effect of the reducing reagent.

Using the non-fired and fired molded bodies according to the invention, it is possible to produce linings of non-ferrous metal smelting converters that are superior to previous linings with regard to infiltration resistance and corrosion resistance to non-ferrous metal melts and liquid slags of non-ferrous metal smelting. In particular, the superiority of the refractory products according to the invention is shown in copper smelting converters, for example in a Pierce-Smith converter (PS converter).

The non-fired, pressed, dried molded bodies have the following properties, for example:
Raw density: 2.65 to 2.85 kg/m$^3$,
Cold pressure strength: 40 to 100, particularly 60 to 85 MPa.

The fired, molded bodies according to the invention have the following properties, for example:
Raw density: 2.55 to 2.85 kg/m$^3$,
Cold pressure strength: 30 to 80, particularly 40 to 70 MPa.

The prefabricated parts according to the invention, that is molded parts, particularly molded and pressed bricks, have the following properties, for example:
Raw density: 2.55 to 2.85 kg/m$^3$,
Cold pressure strength: 30 to 180, particularly 50 to 150 MPa.

Although the products according to the invention are especially suitable for use in PS converters for copper production, they can also be used; with advantages as compared with the usual refractory products, in other applications in which fayalitic slags and inviscid non-ferrous metal melts occur, as is the case in practically the entire non-ferrous metal industry, with the advantages as described.

The concept according to the invention is based on the fact that based on olivine coarse grain as the supporting grain and a relatively high proportion of MgO fine grain or meal grain, equilibrium in the brick, between the reagents coming from the brick and the slag, only occurs at smelting process temperatures above 1000° C., for example between 1200 and 1350° C. At these temperatures, graphite is still effective against the molten media that have already been described, with regard to anti-wetting effect. MgO reacts with $SiO_2$ to produce further forsterite, with the pore volume of the structure being reduced. According to the invention, MgO is selected in stoichiometric excess relative to $SiO_2$ that is available for a reaction, in order to prevent the formation of enstatite, which is not refractory. This reaction in situ during the smelting process seals the brick directly on the fire side, to a great extent, and prevents penetration by the very inviscid metal melt, for example copper melt. Furthermore, in contact with the omnipresent fayalite slag melt (melting temperature 1210° C.) the MgO reacts together with the forsterite (melting temperature 1890° C.) to form olivine mixed crystals. The liquidus temperature of the mixed crystal melt thereby increases, i.e. the reaction product slag-product structure freezes up, i.e. leads to stiffening of the reaction product melt, and the corrosion reaction or infiltration is correspondingly stopped or at least greatly reduced.

According to the invention, one therefore allows pressed molded bodies containing at least olivine raw material, MgO and, if applicable, fine-particle silicic acid, as well as reducing reagent, for example graphite, which bodies have a water content between 1 and 5, particularly between 1.5 and 3 wt.-%, to harden, with MSH phases forming, if applicable, which bring about the hardening. The hardening time is temperature-dependent. It is practical if the pressed molded bodies are allowed to harden for 6 to 120, particularly 24 to 96 hours, and to dry in the temperature range between 50 and 200, particularly between 100 and 150° C., to residual moisture values between 0.1 and 4.5, particularly between 0.1 and 2.5 wt.-% water content, in a suitable drying unit. In this regard, cold pressure strength values between 40 and 100, particularly between 60 and 85 MPa are achieved.

The non-pressed fresh masses, cast into molds and, if necessary, vibrated, which can be produced according to the invention for monolithic prefabricated parts composed of the above-mentioned components have water contents between 4 and 10, particularly between 4 and 6 wt.-%. They are introduced into molds and vibrated, if necessary. They are allowed to harden in air between 15 and 35° C., for example, and to dry in the temperature range indicated above for pressed molded bodies, down to residual moisture values as in the case of the pressed molded bodies. In this regard, cold pressure strength values between 30 and 180, particularly between 50 and 150 MPa are achieved.

According to a further embodiment of the invention, a known binder for refractory products, which contains water, is used in place of water or preferably in combination with it, for example for the MSH phase formation, from the following group of lignin sulfonate, magnesium sulfate, ethyl silicate, and molasses or other types of sugar, in an amount calculated for the dry substance of a batch from 2 to 5 wt.-%, for example, for pressed products and from 4 to 10 wt.-%, for example, for prefabricated parts and casting masses. In this regard, the water proportion of these binders contributes to the MSH phase formation described above.

Furthermore, within the scope of an embodiment of the invention, a known binder for refractory products from the group of pitch and/or tar and, in particular, of the known synthetic resins such as phenolic formaldehyde resins is used in batches according to the invention or products according to the invention, in amounts of 2 to 5 wt.-%, for example, with reference to the dry substance, in each instance.

The products according to the invention are particularly suitable for use in PS converters for copper production, but can also be used in other applications with the same advantages in comparison with usual refractory products, in which applications fayalitic slags and inviscid non-ferrous metal melts occur, as is the case in non-ferrous metal smelting processes, with the advantages as described.

Bricks produced from the batches do not necessarily have to be fired, but rather it is generally sufficient if they are dried, if applicable and/or tempered, so that they can be handled and can be used for lining masonry.

Figure 1:
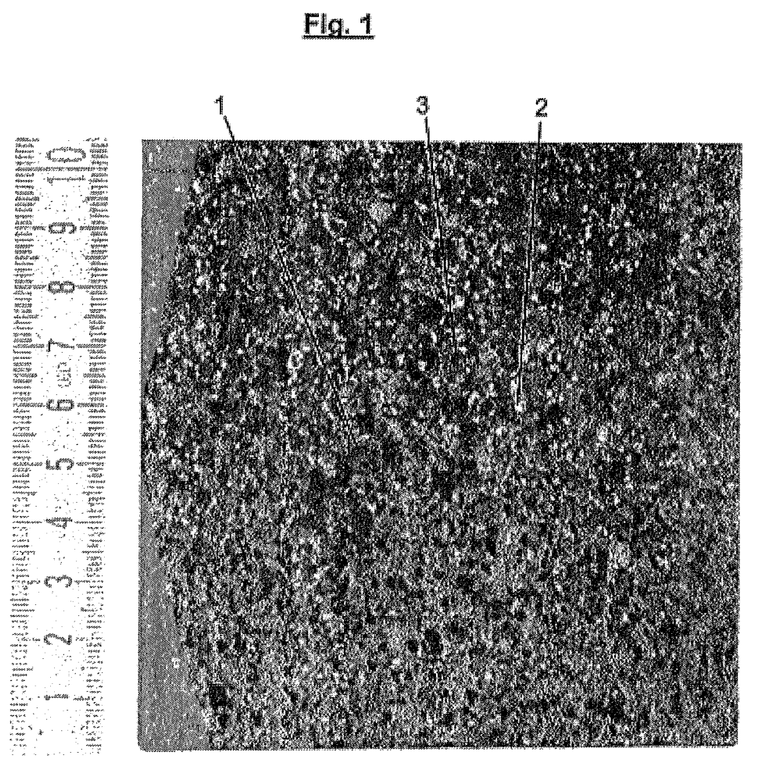
FIG. 1 a pressed, non-fired refractory brick according to the invention.

The invention will be explained in greater detail below, using examples, and will be clarified using a drawing as an example. The figures show:

FIG. 1 shows a pressed, non-fired refractory brick according to the invention, produced from the following formulation:

|  | Grain fraction mm | Amount % |
| --- | --- | --- |
| Raw material | | |
| Olivine | 1-4 | 52 |
| Melt magnesia | 0-1 | 39 |
| Graphite |  | 5 |
| Antioxidants |  | 4 |
|  |  | 100 |
| Binder | | |
| Phenol-resol resin |  | 3 |

The brick according to the invention was dried at 200° C., to a residual moisture of 1.3 wt.-%.

The matrix of the brick according to the invention demonstrates a support structure composed of relatively coarse olivine grains 1 (dark grains), finer grains 2 (white), as well as fine and micro-fine grains of MgO (not visible) and micro-fine black material 3 composed of graphite.

The resistance of the invention with regard to fayalitic melt and copper melt is already known from DE 10 2012 015 026 A1.

The superiority of the invention as compared with DE 10 2012 015 026 A1 and magnesia chromite bricks used until now consists in the resistance, as already described, with regard to copper oxide melt, copper iron oxide melt, and copper sulfide melt. This superiority is evident from the following crucible tests according to DIN 51069.

A sulfidic matte melt, as well as a copper oxide-iron oxide melt from copper smelting was used, having the following mineral phase components:

Phase components of sulfidic matte melt:
bornite $Cu_5FeS_4$
$Cu_2S$
wurtzite $Zn_{0.6}Fe_{0.4}S$
cuprospinel $CuFe_2O_4$
copper Cu Phase components of copper oxide-iron oxide melt:
delafossite $CuFeO_2$
cuprospinel $CuF_2O_4$
cuprite $Cu_2O$
copper Cu The chemical composition of the sulfidic matte melt was the following:

| $SiO_2$ | 0.29% |
| --- | --- |
| $Al_2O_3$ | 0.17% |
| $Fe_2O_3$ | 14.50% |
| $Cr_2O_3$ | 0.00% |
| $TiO_2$ | 0.00% |
| CaO | 0.05% |
| MgO | 0.09% |
| $SO_3$ | 27.40% |
| NiO | 0.00% |
| CuO | 56.20% |
| ZnO | 0.57% |
| PbO | 0.32% |

The chemical composition of the copper oxide-iron oxide melt was the following:

| $SiO_2$ | 13.60% |
| --- | --- |
| $Al_2O_3$ | 0.34% |
| $Fe_2O_3$ | 33.60% |
| $Cr_2O_3$ | 0.16% |
| $TiO_2$ | 0.00% |
| CaO | 0.09% |
| MgO | 0.29% |
| $SO_3$ | 0.07% |
| NiO | 0.28% |
| CuO | 48.20% |
| ZnO | 0.89% |
| PbO | 1.51% |

Figure 2:
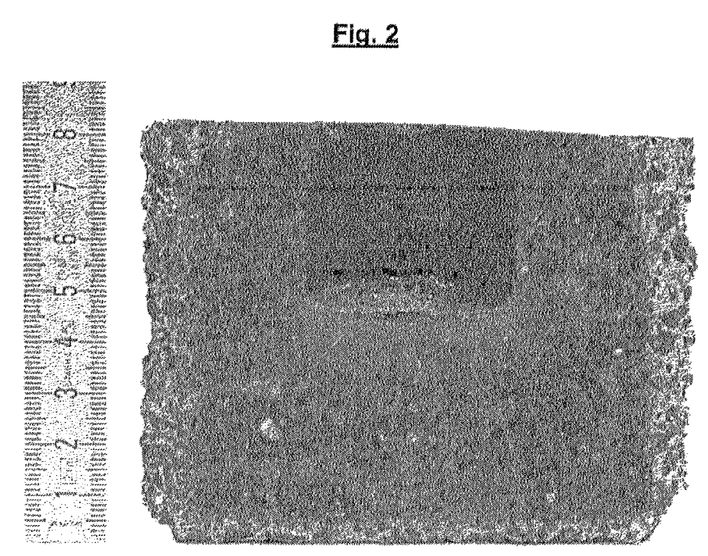
FIG. 2 a crucible composed of brick according to the invention, after a test with sulfidic matte melt.
Figure 3:
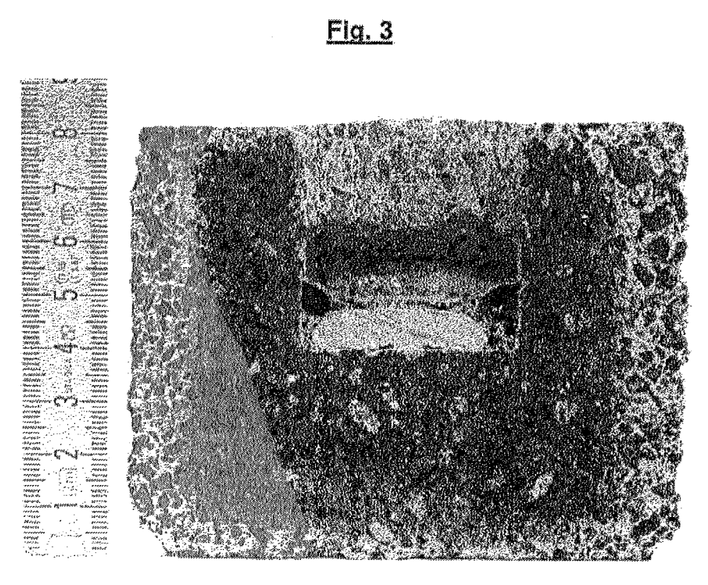
FIG. 3 a crucible composed of brick according to the invention, after a test with copper oxide/iron oxide melt.

The slag, as a powder, was placed into a recess or a crucible of a non-fired brick according to the invention that had been prepared for a crucible test, heated to 1350° C., and held at this temperature for 6 h. After cooling, the crucibles were sawed open diagonally. The two molten slags did not penetrate into the brick. Corrosion of the brick according to the invention is also very slight, as can be seen from the contours of the crucible, which are still sharp. The sulfidic matte melt remained in the crucible completely, without any infiltration or dissolution processes being evident (FIG. 2). In the case of the test with copper oxide-iron oxide melt, it can furthermore be clearly seen that a major portion of the slag was reduced to metallic copper by means of the reagent contained (FIG. 3).

Figure 4:
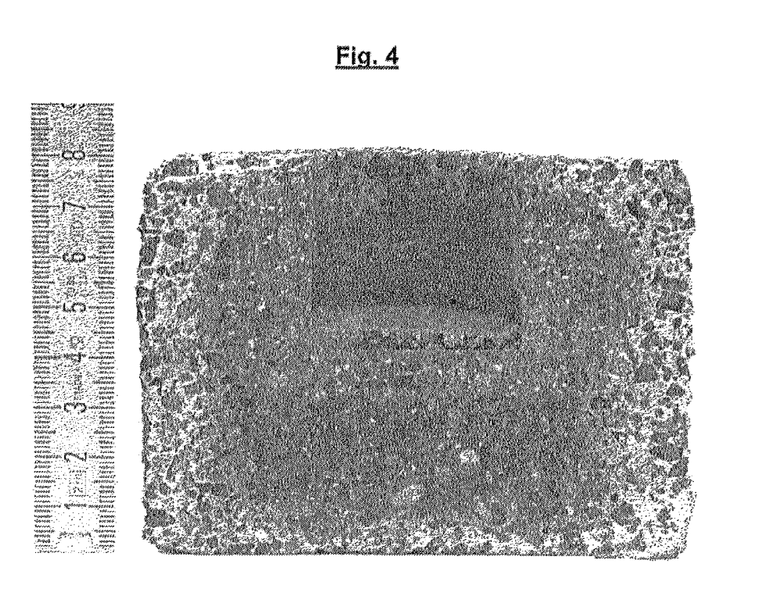
FIG. 4 a crucible according to DE 10 2012 015 026 A1, after a test with sulfidic matte melt.
Figure 5:
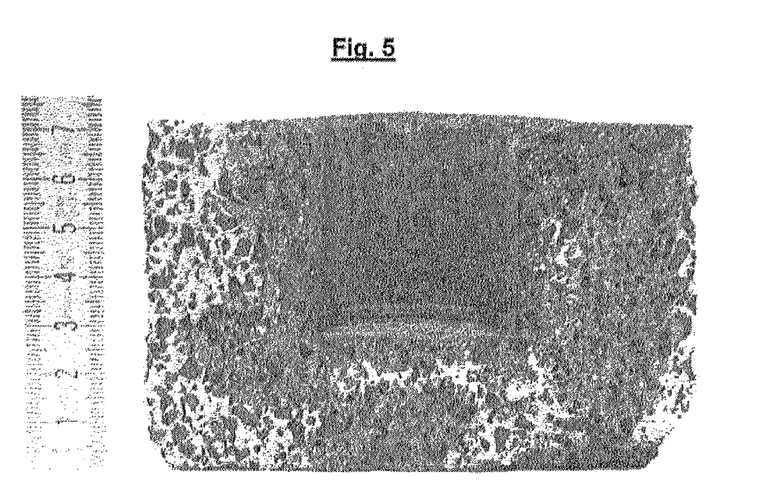
FIG. 5 a crucible according to DE 10 2012 015 026 A1, after a test with copper oxide/iron oxide melt.

In comparison, crucible tests were conducted using crucibles that were produced according to DE 10 2012 015 026 A1. The same slags were used for this purpose. After cooling and diagonal cutting of the crucibles, it was shown that the sulfidic melt partially penetrated into the brick according to DE 10 2012 015 026 A1 (FIG. 4). Furthermore, it was shown that the copper oxide-iron oxide melt completely penetrated into the brick according to DE 10 2012 015 026 A1 (FIG. 5). In contrast, the completely solidified copper melt 8 can still be found in crucible 4 from the FSM brick 10. Almost nothing penetrated into the brick.

The brick according to the invention therefore comprises the following advantages as compared with the brick according to DE 10 2012 015 026 A1:

in terms of application technology: The brick according to the invention is not penetrated by sulfidic matte melt and copper oxide-iron oxide melt, and therefore wears more slowly than a brick according to DE 10 2012 015 026 A1, because of the greater thermomechanical resistance.

The invention claimed is:

1. Refractory product in the form of a dry, mineral batch of refractory mineral materials, for the production of refractory products for fire-side lining of industrial non-ferrous metal smelting furnaces, the dry, mineral batch comprising a basic batch consisting of the following basic batch components, which are mixed to come to 100 wt.-%:
   15 to 74 wt.-% of at least one coarse-grained olivine raw material, with more than 70 wt.-% forsterite and less than 10 wt.-% of iron(III) oxide and having a grain size distribution by at least 95 wt.-%≥1.0 mm, as the main component,
   25 to 55 wt.-% magnesia meal (MgO meal) having less than 10 wt.-% of iron(III) oxide and less than 2.5 wt.-% of silicate secondary phases and having grain sizes of $d_{95} \leq 1$ mm, and
   1 to 30 wt.-% of at least one refractory reagent that acts to reduce non-ferrous metal oxide melts and/or non-ferrous metal iron oxide melts during the smelting process (in situ) and to convert them to non-ferrous metal melts, wherein the reagent is fine-grained carbon having a fineness below 1000 μm and wherein, in a mixture with the other components of the batch, the reagent is homogeneously distributed.

2. Product according to claim 1, wherein the fine-grained carbon is graphite and/or carbon black and/or anthracite and/or coke.

3. Product according to claim 1, comprising the following dry substance compositions:
   30 to 65 wt.-% olivine raw material,
   30 to 50 wt.-% magnesia meal,
   5 to 20 wt.-% reagent.

4. Product according to claim 1, wherein in addition, the dry, mineral batch contains SiC.

5. Product according to claim 1, wherein in addition, the dry, mineral batch contains at least one fine-particle silicic acid that reacts with the MgO meal, when water is added to the dry, mineral batch, to form magnesium silicate hydrate phases.

6. Product according to claim 1, wherein in addition, the dry, mineral batch contains at least one known binder for refractory products, in dry, fine-particle form.

7. Product according to claim 6, wherein the binder is a binder that contains carbon.

8. Product in the form of a molded refractory brick, produced from a refractory batch according to claim 1, by mixing the dry, mineral batch with water and/or a liquid binder for refractory products, to form a moldable fresh mass, and pressing the fresh mass, wherein the reducing reagent is homogeneously distributed in the structure of the brick.

9. Product according to claim 8, having at least one binder phase that has hardened from the binder for refractory products and firmly connects the batch grains.

10. Product according to claim 8, wherein the brick is ceramically fired and has sintering bridges between batch grains.

11. Product according to claim 9, wherein the binder phase has a coke structure.

12. Product according to claim 8, having at least one binder phase,
    wherein the binder phase contains magnesium silicate hydrate.

13. Refractory product in the form of fire-side refractory masonry in the region of oxidizing smelting processes in an industrial non-ferrous metal smelting furnace built from refractory bricks according to claim 8.

14. Refractory product in the form of a monolithic fire-side refractory lining in the region of oxidizing smelting processes of an industrial non-ferrous metal smelting furnace produced by mixing a dry, mineral batch according to claim 1 with water and/or a liquid binder for refractory products, to form a fresh mass, lining the inner wall of the industrial non-ferrous metal smelting furnace with the fresh mass on the fire side, wherein the reducing reagent is homogeneously distributed in the structure of the lining.

15. Product according to claim 1, wherein the olivine raw material has more than 75 wt.-% forsterite.

16. Product according to claim 1, wherein the magnesia meal has >90 wt.-% or >95 wt.-% MgO.

17. Product according to claim 1, wherein the grain size of the olivine raw material lies by at least 95 wt.-% between 1 and 8 mm.

18. Product according to claim 4, wherein the dry, mineral batch contains the SiC in amounts up to 15 wt.-%.

19. Product according to claim 4, wherein the dry, mineral batch contains the SiC in amounts up to 10 wt.-%.

20. Product according to claim 5, wherein the dry, mineral batch contains the at least one fine-particle silicic acid in amounts up to 10 wt.-%.

21. Product according to claim 5, wherein the dry, mineral batch contains the at least one fine-particle silicic acid in amounts from 0.5 to 6 wt.-%.

22. Product according to claim 6, wherein the dry, mineral batch contains the at least one known binder in amounts up to 10 wt.-%.

23. Product according to claim 6, wherein the dry, mineral batch contains the at least one known binder in amounts up to 6 wt.-%.

24. Product according to claim 7, wherein the binder is tar and/or pitch and/or a synthetic resin binder.

25. Product according to claim 1, wherein the dry, mineral batch consists of the basic batch.

26. Product according to claim 8, wherein the brick is dried and/or tempered.

27. Product according to claim 13, wherein the industrial non-ferrous metal smelting furnace is a copper smelting furnace.

28. Product according to claim 14, wherein the lining is dried and/or tempered.

29. Product according to claim 14, wherein the industrial non-ferrous metal smelting furnace is a copper smelting furnace.

30. Refractory product in the form of fire-side refractory masonry in the region of inviscid non-ferrous metal oxides in an industrial non-ferrous metal smelting furnace, built from refractory bricks according to claim 8.

31. Refractory product in the form of fire-side refractory lining in the region of inviscid non-ferrous metal oxides in an industrial non-ferrous metal smelting furnace, produced by mixing a dry, mineral batch according to claim 1 with water and/or a liquid binder for refractory products to form a fresh mass, and lining the inner wall of the industrial non-ferrous metal smelting furnace with the fresh mass on the fire side, wherein the reducing reagent is homogeneously distributed in the structure of the lining.

32. A smelting method comprising:
building a smelting furnace from refractory bricks according to claim 8, the refractory bricks forming fire-side refractory masonry of the smelting furnace, the refractory bricks facing a furnace zone within the smelting furnace; and
smelting non-ferrous metal in the furnace zone of the smelting furnace in an oxidizing manner.

* * * * *